United States Patent Office 3,334,042
Patented Aug. 1, 1967

3,334,042
PROCESS FOR SEPARATING WATER FROM
IMMISCIBLE HYDROCARBON LIQUID
Arjen Teitsma, Muskegon, Mich., assignor to E. I. du Pont de Nemours and Company, Wilmington, Del., a corporation of Delaware
No Drawing. Filed June 30, 1964, Ser. No. 379,402
10 Claims. (Cl. 208—187)

This invention relates to an improved method for isolating an immiscible hydrocarbon liquid from its dispersion in an aqueous medium and in particular, to an improved method for reducing the water content of the oil layer which forms when a dispersion of oil and carbon in water is allowed to separate into phases.

In the process of producing acetylene by pyrolysis of hydrocarbons in an electric arc, carbon forms in the arc furnace and enters both the gaseous product stream and the furnace quench-water streams. The product stream is scrubbed with water to remove entrained carbon. The scrub water as well as the quench water then both contain dispersed carbon particles as well as quantities of dissolved product. The presence of dissolved product in these by-product aqueous media preclude easy disposal because of the polluting effect of the dissolved product. The necessity for disposal of these aqueous media is avoided by recirculation thereof to the arc furnace. Unfortunately, however, the carbon particles contained in this medium tend to accumulate and plug the equipment and piping during such recirculation. An advantageous method of removing the carbon particles from this medium is to maintain the medium as a flowing stream and to contact the carbon particles therein with fine droplets of immiscible liquid hydrocarbon, which results in agglomeration between the carbon particles and the liquid hydrocarbon droplets.

Heretofore, the resulting agglomerates have been allowed to coalesce by continuously discharging the aqueous stream into one end of a relatively large and quiescent body thereof and the resultant upper and lower layers have been continuously and separately withdrawn from points remote to the addition end of the body. While the extreme upper surface of the quiescent body rapidly becomes almost entirely composed of liquid hydrocarbon (containing the carbon particles), the proportion of water present increases with increasing depth so that a sharp interface between upper and lower layers is not rapidly obtained. Thus, a substantial quantity of water is withdrawn with the upper layer, which water poses difficulty in the disposal of the upper layer by burning as a fuel.

One solution of this problem is to lengthen the time in which the upper and lower layers have to form. The equipment and space disadvantages and limitations on this approach are obvious. A more rapid method of reducing the water content of this upper layer is desired.

It is therefore an object of the present invention to provide an improved method for reducing the water content of the upper layer described above and thereby an improved method for separating the oil-carbon agglomerates from the aqueous by-product streams of the arc-acetylene process. In the more general aspect, it is an object of the present invention to provide an improved process for separating an immiscible liquid from its aqueous dispersion. Other objects will appear hereinafter.

It has been found that an immiscible hydrocarbon liquid can be isolated in an improved manner from its aqueous dispersion by allowing the dispersion to separate into upper and lower layers and separating these layers one from the other as in the prior art and then by contacting a flexible, absorptive, cellular body, such as a sponge, with the upper layer to obtain its absorption into the sponge, followed by withdrawing the resultant absorbed liquid therefrom. The withdrawal step generally consists by distorting the sponge sufficiently, for example by compressing it, to obtain effluence of the absorbed liquids. Unexpectedly, these liquids are discharged in sequence, first one and then the other. It is believed that this distortion of the liquid impregnated sponge causes the liquid phases contained therein to coalesce.

The "upper layer" which is treated according to this invention does not mean a distinct layer since, as previously explained, an inordinate amount of time is required for a distinct interface to occur. Instead, "upper layer" means the hydrocarbon liquid-rich zone of the quiescent body, with the average proportion of hydrocarbon liquid present in the withdrawn stream depending on the depth of the body at which withdrawing, as by decanting, is carried out. As will be shown hereinafter, the withdrawn upper layer should contain at least about 35% by weight of water for the process of the present invention to be effective. Within this limitation, the depth at which decantation is carried out can be fixed to obtain an upper layer having the water content desired, with the maximum proportion of water being determined by considerations of economics. Generally, but not necessarily, the upper layer which is "topped" or decanted contains greater than 30% by weight of oil.

The aqueous dispersion of oil agglomerate obtained in the arc-acetylene process as previously described is an example of the dispersion that can be treated according to this process to obtain a relatively rapid reduction in water content of the oil layer which forms when the aqueous dispersion is allowed to separate into phases.

It should be understood that the withdrawing of the absorbed liquid from the sponge is to be done at such a rate that the initially discharged liquid phase can be identified up to the point when discharge of the remaining phase commences. In the case of the water-oil mixture, water is the first phase to flow from the sponge, followed by the oil phase. A visual guide of the approach of the endpoint of water discharge would be the appearance of oil on the surface of the sponge.

By the use of the term "sponge," it will be understood that the cells thereof are interconnected in a substantially continuous fashion. Closed cells may also be present, but these cells only detract from the liquid holding capactiy of the sponge. The flexible cellular body or sponge may be naturally occurring sponge or it may be any flexible sponge-like material derived from, for example, polyurethane materials, polychloroprene compositions, styrene-butadiene-copolymer compositions, chlorosulfonated polyethylene composition. Preferred sponge compositions for separating these mixtures are those based on polyurethanes because of their excellent resistance to liquid hydrocarbons such as oil. The synthetic sponge-like material may be made by any of the methods which are well known in the art.

In the examples the cellular body used is a polyurethane foam which can be prepared according to techniques disclosed in the E. I. du Pont de Nemours and Co. Elastomer Chemical Report, "Molding One-Shot Resilient Urethane Foam," Nov. 8, 1962.

The size of the sponge piece is not critical to the operation of the process, and since it may be reused after exhausting the liquid components of the mixture, the process may be operated in a continuous fashion and not necessarily discontinuously as is shown in the examples. Thus, separation may be effected in an endless belt arrangement of sponges whereby suitable impregnating baths and rollers continuously provide the required kneading to obtain liquid pickup, coalescence, and discharge. Alternatively, the compressive action for liquid discharge may be simulated by applying a vacuum to one side of the saturated sponge.

The compositions of the carbon-oil-water mixtures are critical to the operation of the process. As illustrated in the examples, no recovery of water occurs when the water content of the mixture is 26% by weight while 45.1% efficiency is attained when the starting composition has 37% by weight of water. Thus, the critical lower limit in an operable composition is about 35% by weight of water based on the total weight, including solids, of the upper layer.

The process of the present invention may be operated at temperatures between the freezing point and the boiling point of water, provided the cellular body is flexible at these temperatures. Convenient operating temperatures are from 15 to 35° C.

The following examples are merely representative of the process of the present invention and accordingly this invention is not limited thereto. Parts and percents are by weight unless otherwise noted.

*Examples 1 to 4*

In these examples, weighed pieces of polyurethane sponge having a uniform porosity and a density about 1.4 pounds per cubic foot are each impregnated at room temperature with a carbon-oil-water mixture by placing the sponge in a vessel, covering it with the dispersion, and kneading the sponge lightly to aid impregnation until saturation is complete. Additional mixture is added if necessary to complete the saturation. The saturated sponge is then removed from the vessel, weighed, and the amount of mixture absorbed is determined by difference. The sponge is then slowly compressed over a recovery vessel until the water phase is removed and the oil-carbon phase appears. The recovered water is weighed, and the efficiency of water recovery is calculated. With further compression, the carbon-oil phase flows from the sponge and is recovered in a separate vessel. Data describing these experiments are listed in the table which follows.

TABLE—SUMMARY OF RESULTS

|  | Ex. No. 1 | Ex. No. 2 | Ex. No. 3 | Ex. No. 4 |
|---|---|---|---|---|
| Composition of Mixture, percent: |  |  |  |  |
| Carbon | 11.2 | 7.3 | 5.0 | 5.2 |
| Oil | 52.0 | 52.0 | 20.0 | 32.0 |
| Water | 37.0 | 41.0 | 75.0 | 63.0 |
| Size of foam sample, inches | 3 x 8 x 1 | 8 x 2 x 1¼ | 12 x 14 x ¼ | 7¾ x 11 x 3 |
| Weight of mixture absorbed, grams | 72 | 58 | 235 | 169 |
| Weight of water in sample, grams (calculated) | 26.6 | 23.8 | 176.3 | 106.5 |
| Weight of water recovered, grams | 12 | 13 | 112 | 91 |
| Percent efficiency of water recovery | 45.1 | 54.6 | 63.6 | 85.4 |

*Example 5*

The procedure of Examples 1 to 4 is repeated using another piece of the sponge with dimensions 11 x 5.5 x 1¼ inches, and a mixture containing carbon (10.0%), oil (64.0%) and water (26.0%). Upon compression, no water is separated and only the starting mixture is recovered.

It is apparent that the process of the present invention can be practiced economically on mixtures of water and an immiscible hydrocarbon liquid which are high in the latter or on aqueous dispersions thereof after the preliminary steps of allowing the immiscible liquids to form layers and then separating the layers from each other.

As many widely different embodiments of this invention may be made without departing from the spirit and scope thereof, it is to be understood that this invention is not limited to the specific embodiments thereof except as defined in the appended claims.

What is claimed is:
1. A process for reducing the water content of a mixture of water and an immiscible hydrocarbon liquid, said mixture containing at least about 35% by weight of said water, comprising contacting a sponge with said mixture to obtain absorption thereof and withdrawing the resultant absorbed liquid from said sponge, whereby the water and immiscible hydrocarbon liquid of said absorbed liquid flow from said sponge in sequence.

2. The process as recited in claim 1 and separately collecting the withdrawn water and immiscible hydrocarbon liquid.

3. The process as recited in claim 1 wherein said withdrawing is obtained by compressing said sponge sufficiently to remove said water and additionally compressing said sponge to remove said immiscible hydrocarbon liquid.

4. The process as recited in claim 1 wherein said sponge is made of polyurethane.

5. The process as recited in claim 1 wherein said mixture contains carbon particles.

6. The process as recited in claim 1 wherein a vacuum is applied to said sponge to remove at least some of said absorbed liquid.

7. The process as recited in claim 6 wherein said vacuum is applied to remove said water.

8. A process for reducing the water content of a mixture of water and an immiscible hydrocarbon liquid, said mixture containing at least about 35% by weight of said water, comprising absorbing said mixture into a sponge and withdrawing the resultant absorbed liquid from said sponge, whereby the water and immiscible hydrocarbon liquid from said absorbed liquid flow from said sponge in sequence.

9. A process for reducing the water content of a mixture of water and oil, said mixture containing at least about 35% by weight of said water, comprising absorbing said mixture into a sponge and compressing said sponge, whereby water from the absorbed mixture is discharged initially, followed by the oil from said absorbed mixture.

10. In the process of isolating an immiscible hydrocarbon liquid from its aqueous dispersion by allowing said dispersion to form layers of water and said immiscible hydrocarbon liquid and then separating said layers one from the other, the improvement comprising contacting a sponge with the immiscible hydrocarbon liquid layer to obtain absorption thereof, said immiscible hydrocarbon liquid layer containing at least 35% by weight of said water, and withdrawing the resultant absorbed liquid from said sponge, whereby the water and immiscible hydrocarbon liquid of said absorbed liquid flow from said sponge in sequence.

References Cited

UNITED STATES PATENTS 3,146,192   8/1964   McClintock _____ 210—40

MORRIS O. WOLK, *Primary Examiner.*

E. G. WHITBY, *Assistant Examiner.*